United States Patent
Zhang et al.

(10) Patent No.: US 9,524,555 B2
(45) Date of Patent: Dec. 20, 2016

(54) METHOD AND COMPUTER PROGRAM PRODUCT OF THE SIMULTANEOUS POSE AND POINTS-CORRESPONDENCES DETERMINATION FROM A PLANAR MODEL

(75) Inventors: Guangjun Zhang, Beijing (CN); Zhenzhong Wei, Beijing (CN); Wei Wang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 250 days.

(21) Appl. No.: 14/360,388

(22) PCT Filed: Dec. 12, 2011

(86) PCT No.: PCT/CN2011/083850
§ 371 (c)(1),
(2), (4) Date: May 23, 2014

(87) PCT Pub. No.: WO2013/086678
PCT Pub. Date: Jun. 20, 2013

(65) Prior Publication Data
US 2014/0321735 A1     Oct. 30, 2014

(51) Int. Cl.
*G06T 7/00*     (2006.01)
*G06T 3/00*     (2006.01)
*H04N 13/02*    (2006.01)

(52) U.S. Cl.
CPC .......... *G06T 7/0046* (2013.01); *G06T 3/0075* (2013.01); *G06T 7/0022* (2013.01); *G06T 2207/10012* (2013.01); *H04N 13/0239* (2013.01)

(58) Field of Classification Search
CPC ............... G06T 2207/10012; G06T 7/0022; G06T 7/0046; G06T 3/0075; H04N 13/0239
See application file for complete search history.

(56) References Cited

U.S. PATENT DOCUMENTS

| | | | | |
|---|---|---|---|---|
| 6,985,620 B2 * | 1/2006 | Sawhney | ................ | G01S 5/163 345/419 |
| 7,957,584 B2 * | 6/2011 | Najafi | .................. | G06K 9/3208 382/154 |

(Continued)

FOREIGN PATENT DOCUMENTS

CN     101377812 A   *   3/2009

OTHER PUBLICATIONS

Philip David, Daniel DeMenthon, Ramani Duraiswami, Hanan Samet, SoftPOSIT: Simultaneous Pose and Correspondence Determination, Proceedings of the 7th European Conference on Computer Vision—Part III, p. 698-714, May 28-31, 2002.*

(Continued)

*Primary Examiner* — Kim Vu
*Assistant Examiner* — Pinalben Patel
(74) *Attorney, Agent, or Firm* — Oppedahl Patent Law Firm LLC (57) ABSTRACT

A method and software for the simultaneous pose and points-correspondences determination from a planar model are disclosed. The method includes using a coarse pose estimation algorithm to obtain two possible coarse poses, and using each one of the two coarse poses as the initialization of the extended TsPose algorithm to obtain two candidate estimated poses; selecting one from the two candidate estimated poses based on the cost function value. Thus, The method solves the problem of pose redundancy in the simultaneous pose and points-correspondences determination from a planar model, i.e., the problem that the numbers of estimated poses increase exponentially as the iterations go. The disclosed embodiment is based on the (Continued)

coplanar points, and does not place restriction on the shape of a planar model. It performs well in a cluttered and occluded environment, and is noise-resilient in the presence of different levels of noise.

12 Claims, 5 Drawing Sheets

(56) References Cited

U.S. PATENT DOCUMENTS

| | | | |
|---|---|---|---|
| 8,126,260 B2 | 2/2012 | Wallack | |
| 2008/0298672 A1 | 12/2008 | Wallack | |
| 2009/0074238 A1* | 3/2009 | Pfister | G06T 7/0046 |
| | | | 382/100 |
| 2009/0110267 A1* | 4/2009 | Zakhor | G06T 7/0046 |
| | | | 382/154 |
| 2012/0148145 A1* | 6/2012 | Liu | G06T 7/0075 |
| | | | 382/154 |
| 2013/0250050 A1* | 9/2013 | Kanaujia | H04N 13/0007 |
| | | | 348/42 |
| 2015/0371440 A1* | 12/2015 | Pirchheim | G06T 17/05 |
| | | | 345/419 |

OTHER PUBLICATIONS

International Search Report in international application No. PCT/CN2011/083850, mailed on Sep. 6, 2012.
English Translation of the Written Opinion of the International Search Authority in international application No. PCT/CN2011/083850, mailed on Sep. 6, 2012.
Planar Pose Estimation Baesed on Monocular Vision, Jun. 20, 2011.

* cited by examiner

METHOD AND COMPUTER PROGRAM PRODUCT OF THE SIMULTANEOUS POSE AND POINTS-CORRESPONDENCES DETERMINATION FROM A PLANAR MODEL

TECHNICAL FIELD

The present invention relates to the monocular model-based pose estimation. More specifically, the present invention relates to a=method and a computer program product of the simultaneous pose and points-correspondences determination from a planar model.

BACKGROUND

Model-based pose estimation from a monocular camera consists of estimating the position and orientation of a calibrated camera with respect to a known model, under the assumption that a set of features (such as 3D model points, lines, or conics) and their images points are given. Pose estimation is a fundamental problem in computer vision and can find its applications in visual servoing, pattern recognition, camera calibration, and etc.

The literature on pose estimation is extensive and falls into two categories: iterative algorithms and noniterative algorithms. The noniterative algorithms such as the algorithm of Gerald Schweighofer and Axel Pinz, the iterative algorithms such as the method of Oberkampf et al and the method of L. S. Davis et al., all these algorithms require known correspondences, i.e., the known points or lines correspondences. In addition, there are some algorithms which attempt to solve the pose and correspondences simultaneously, the typical example is the SoftPosit algorithm.

The existing methods can handle the simultaneous pose and correspondences determination given a 3D model, such as the SoftPosit algorithm. However, it fails in the presence of a planar model because it cannot cope with the pose redundancy, which states that the estimated poses increase exponentially as iterations continue.

As stated above, the applications of the existing pose estimation algorithms are limited by the requirements of known points-correspondences or a 3D model. In view of the above-mentioned problems, particularly the pose redundancy problem that the number of the estimated poses increase exponentially as iterations go for a planar model, we disclose in the invention an effective method and a software to solve the simultaneous pose and points-correspondences determination for a planar model.

SUMMARY

Since there exists the pose redundancy problem for the simultaneous pose and correspondences determination for a planar model that the number of the estimated poses increases exponentially as iterations continue, it is of good practical value to disclose a method and a computer product to solve the problem.

To solve the pose redundancy problem above, the present invention is embodied in a method of the simultaneous pose and correspondences determination for a planar model, comprising:

Obtaining two possible coarse poses of a planar model by a coarse pose estimation algorithm;

Obtaining two pose candidates by the iterative extended TsPose algorithm initialized with the two possible coarse pose estimates; and Selecting a pose as the final output from the two pose candidates based on said coarse poses.

The method described above, wherein said obtaining two pose candidates by the iterative extended TsPose algorithm further comprises:

using each of the two coarse pose estimates as an initial estimate, forming the initial correspondences matrix by the computations of the initial "tangent-image" points, updating the correspondences matrix, and estimating the objective function value;

updating the affine transformation and recovering two rotation matrices based on the updated affine transformation, selecting a new rotation matrix and a new tangent-image plane based on the coarse azimuth angle of the coarse pose in the initialization, and estimating a new translation vector and new "tangent-image" points based on the new tangent-image plane;

determining whether the convergence criterion is satisfied, if it is satisfied, then terminating the iterative searching of the extended TsPose algorithm; if not, then continuing a new iteration based on the estimated new "tangent-image" points until the convergence criterion is satisfied; and said pose estimate including a rotation matrix, a translation vector, and/or a correspondence matrix; using said pose estimate as a pose candidate when the iterative searching is terminated.

The method described above further comprises:

When the iterative searching terminates, judging whether said initial estimate is used, if there exists a unused said initial estimate, using the unused said initial estimate as the initial estimate of the extended TsPose algorithm and conducting the iterative searching of the extended TsPose algorithm to obtain a pose candidate.

The method described above, wherein said convergence criterion is that the uncertainty parameter $\beta$ is more than the prescribed maximum value, wherein the uncertainty parameter $\beta$ corresponds to the multiplication of the initial $\beta_0$ and a uncertainty update parameter $\beta_u$; and/or, said convergence criterion is that the objective function value is smaller than a prescribed parameter $\epsilon$;

Whenever either of said convergence criterions is satisfied, the iterative searching is terminated.

The method described above, wherein selecting a pose as the final output from the two pose candidates based on said coarse poses further comprises:

When two said initial estimates are used, selecting the pose candidate corresponding to a smaller objective function value and using it as the final output.

A second embodiment of the present invention is a computer program product of the simultaneous pose and correspondences determination from a planar model, comprising:

A computer-readable medium storing a computer program implementing the method described above, and a computer-readable code implementing the method of the simultaneous pose and points-correspondences determination from a planar model; the method of the simultaneous pose and points-correspondences determination from a planar model including:

Obtaining two possible coarse poses of the planar model based on a coarse pose estimation algorithm;

Obtaining two pose candidates based on the iterative searching of the extended TsPose algorithm which is initialized by each of the two possible coarse pose estimates; and Selecting a pose as the final output from the two pose candidates based on said coarse poses.

The computer program produce described above, wherein said obtaining two pose candidates based on the iterative searching of the extended TsPose algorithm further comprises:

using each of the two coarse pose estimates as an initial estimate, forming the initial correspondences matrix based on the computations of the initial "tangent-image" points and updating the correspondences matrix, and estimating the objective function value;

updating the affine transformation and recovering two rotation matrices based on the updated affine transformation, selecting a new rotation matrix and a new tangent-image plane based on the coarse azimuth angle of the coarse pose in the initial, and estimating a new translation vector and new "tangent-image" points based on the new tangent-image plane;

determining whether the convergence criterion is satisfied, if it is satisfied, then terminating the iterative searching of the extended TsPose algorithm; if not, then continuing the new iteration based on the estimated new "tangent-image" points until the convergence criterion is satisfied; and said pose estimate including a rotation matrix, a translation vector, and/or a correspondence matrix; using said pose estimate as a pose candidate when the iterative searching is terminated.

The computer program product described above, wherein said method further comprises:

When the iterative searching terminates, judging whether said initial estimate is used, if there unused is said initial estimate, using the unused said initial estimate as the initial estimate of the extended TsPose algorithm and conducting the iterative searching of the extended TsPose algorithm to obtain a pose candidate.

The computer program product described above, wherein said convergence criterion is that the uncertainty parameter $\beta$ is more than the prescribed maximum value, wherein the uncertainty parameter $\beta$ corresponds to the multiplication of the initial $\beta_0$ and a uncertainty update parameter $\beta_u$; and/or, said convergence criterion is that the objective function value is smaller than a prescribed parameter $\epsilon$;

Whenever either of said convergence criterions is satisfied, the iterative searching is terminated.

The computer program product described above, wherein selecting a pose as the final output from the two pose candidates based on said coarse poses further comprises:

When two said initial estimates are used, selecting the pose candidate corresponding to a smaller objective function value and using it as the final output accurate pose result.

Compared to the existing methods, the present invention has the advantages as follows:

the present invention disclose a method of the simultaneous pose and points-correspondences determination from a planar model, comprising the steps of:

(1) using a cluster method to obtain two possible coarse poses, based on which the space of searching is restricted and the problem of pose redundancy is solved;

(2) using the extended TsPose algorithm to estimate a more accurate points correspondences and pose result, wherein said TsPose algorithm is an algorithm for the accurate pose determination, i.e., the tangent-image sliding algorithm; and said extended TsPose algorithm is an algorithm combined the Softassign algorithm for estimating the points-correspondences and the TsPose algorithm for the accurate pose determination in an iterative scheme.

In addition, the present invention can solve the pose redundancy problem, wherein the estimate poses increase exponentially, in the simultaneous pose and points-correspondences determination from a planar model; and the disclosed method in the present invention is based on the coplanar points and does not place restrictions on the shape of a planar model, therefore, it does not require a hard condition, the disclosed method in the present invention performs well in a cluttered and occluded environment with different levels of noise and hence own practical applied value.

The present invention is embodied in a method of estimating two possible coarse poses from a set of model points and a set of image points with unknown correspondences. Firstly, transform each cluster formed by a single anchor point and its c closest neighbors so that its center is at the origin and its covariance matrix is an identity matrix, then compute the polar coordinates of each cluster, and rearrange points of each cluster in an increasing polar angle order. Next, compute the subspace distances associated with every possible combination pair of each model cluster and each image cluster, and retain the combination pair corresponding to the minimum subspace distance. Thirdly, select good matching combination pairs whose associated subspace distances fall below a predefined threshold. Fourthly, estimate the affine parameter based on each selected good pair, and then recover two possible coarse orientations of the model plane and depths of the translation vector from each estimated affine parameter. Finally, use k-means algorithm to generate two possible coarse poses and depths of the translation vector by clustering all estimated coarse orientations and depths.

A second embodiment of the present invention is an iterative algorithm, named as the TsPose algorithm, for accurately estimating the pose of a planar model and the points-correspondences. The TsPose algorithm is initialized with one of the two coarse pose, with the initial tangent-image points computed by the initial orientation. A matrix of correspondences is computed from the current tangent-image points, the current affine transformation, and the model points, and updated by the Sinkhorn algorithm. The affine transformation relating the model points and the image points is updated using the current matrix of correspondences. Two orientations represented by elevation and azimuth angles and translation vectors are computed from the current affine transformation. The orientation and the translation vector corresponding to a smaller absolute difference between the estimated azimuth angle and the input coarse azimuth angle are retained, and the tangent-image points are updated by the retained orientation. The above mentioned process is repeated until the objective function value is smaller than a prescribed tolerance or the maximum number of iterations is attainted. Two independent trials initialized with different coarse poses and the same parameters setting should be performed, and the pose and the matrix of correspondences from the trail whose objective function value is relatively smaller is retained as the output.

The present invention is also embodied in a software. The software includes a computer-readable medium that stores instructions for causing a computer to perform the simultaneous pose and points-correspondences determination from a planar model, and the computer-readable code that implements the method for the simultaneous and points-correspondences pose determination from a planar model.

DETAILED DESCRIPTION

The basic idea of the present invention consists of a two-step method for the simultaneous pose and points-correspondences from a planar model: in the first step, obtaining two possible coarse poses to restrict the scope of searching and therefore solve the problem of pose redundancy; in the second step, using each of the two possible coarse pose as the initialization of the iterative algorithm combing a points-correspondence finding algorithm and a accurate pose estimation algorithm and then obtaining a more accurate pose by the iterative searching, wherein said coarse poses comprise the coarse pose angles and the coarse z-entry of the translation vector; said accurate pose comprises pose angles and a translation vector.

The above and other aspects of the present invention will be shown and described in detail with reference to the exemplary embodiments thereof and the accompanying drawings.

The exemplary embodiments of the invention cover obtaining two possible coarse poses of the planar model based on a coarse pose estimation algorithm, obtaining two pose candidates based on the iterative searching of the extended TsPose algorithm which is initialized by each of the two possible coarse pose estimates, and selecting a pose as the final output from the two pose candidates based on said coarse poses.

The first step—a coarse pose estimation algorithm, comprising the steps of:

S101, Constructing the model clusters and the image clusters;

In the step of S101, suppose that the number of neighbor points is set to be k; computing all the distances between a single anchor model point and the remaining model points, and selecting the k closest points of the anchor model points and constructing a model cluster by taking the anchor model points and its k closest points; the number of points in a model cluster is k+1.

Similarly, computing all the distances between a single anchor image point and the remaining image points, and selecting the k closest points of the anchor image point and constructing a image cluster by taking the anchor image points and its k closest points; the number of points in a image cluster is k+1. In the exemplary embodiment, suppose that the number of model points is m and the number of image points is n, accordingly, m model cluster and n image clusters will be constructed respectively.

S102 Applying transformations to the points of each model and image clusters respectively.

In the step, the said transformations applied to the points of each model and image clusters involve: centering the model points in each model cluster by subtracting their centroid and applying the whitening transformation in the formula (1-3) to the points of each model cluster; accordingly, centering the image points in each image cluster by subtracting their centroid and applying the whitening transformation in the formula (1-3) to the points of each image cluster.

S103, rearranging the orders of the points of each model and image clusters.

In the step, computing the polar coordinates of each transformed model cluster, and rearranging the points of each model cluster in increasing order of polar angles; In the same way, computing the polar coordinates of each transformed image cluster, and rearranging the points of each image cluster in increasing order of polar angles;

S104, computing the subspace distances and constructing the matrix of the subspace distances;

In the step, computing the subspace distance between the image points of an image cluster in (k+1) permutations and the ordered model points in a model cluster, retaining the minimum value of all the subspaces, the order of model points in the model cluster, and the order of image points corresponding to the minimum value in the image cluster, applying the procedures described above to each model and image cluster to produce a m×n matrix of subspaces, wherein each row of the matrix represents a model cluster and each column represents an image cluster;

S105, set a threshold d for the subspace distances, and selecting the model and image clusters whose corresponding subspace distances fall below the threshold d.

Applying the steps S102-S105 to the points in the model and image clusters can produce transformed model and image points with fewer possible correspondences and therefore lead to a reduction of computational cost in finding the desired correspondences.

Figure 4A:
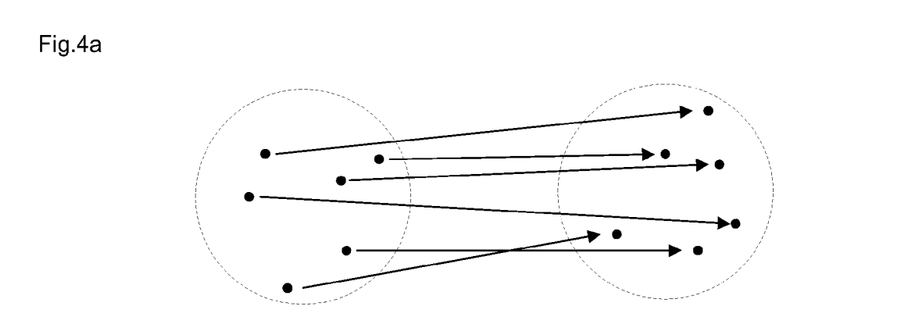
FIG. 4a is a drawing illustrating one possible matching in a key feature.
Figure 4B:
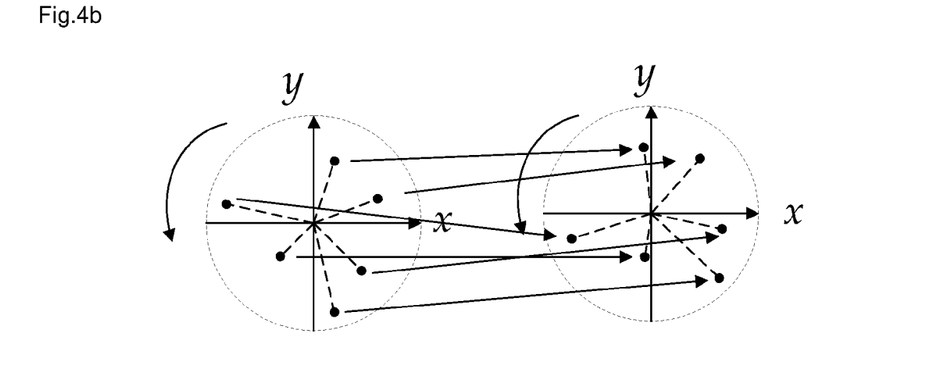
FIG. 4b is a drawing illustrating one possible matching in a modified key feature.
Figure 5A:
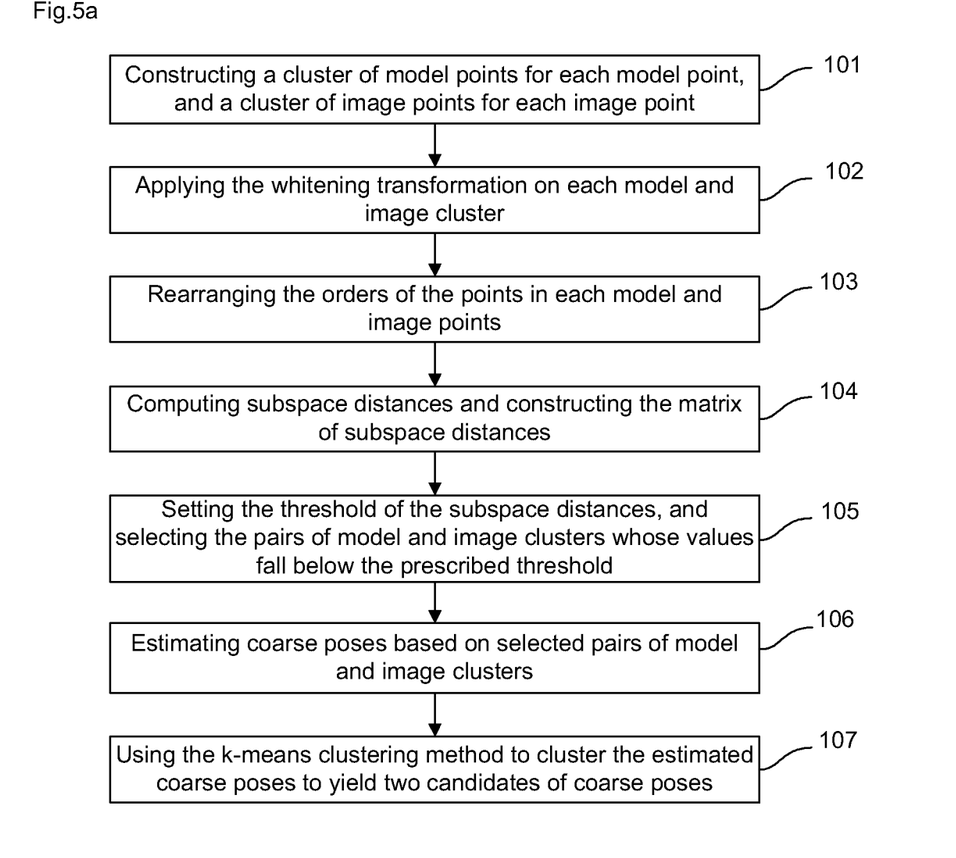
FIG. 5a is a flow diagram of the coarse pose estimation algorithm.
Figure 5B:
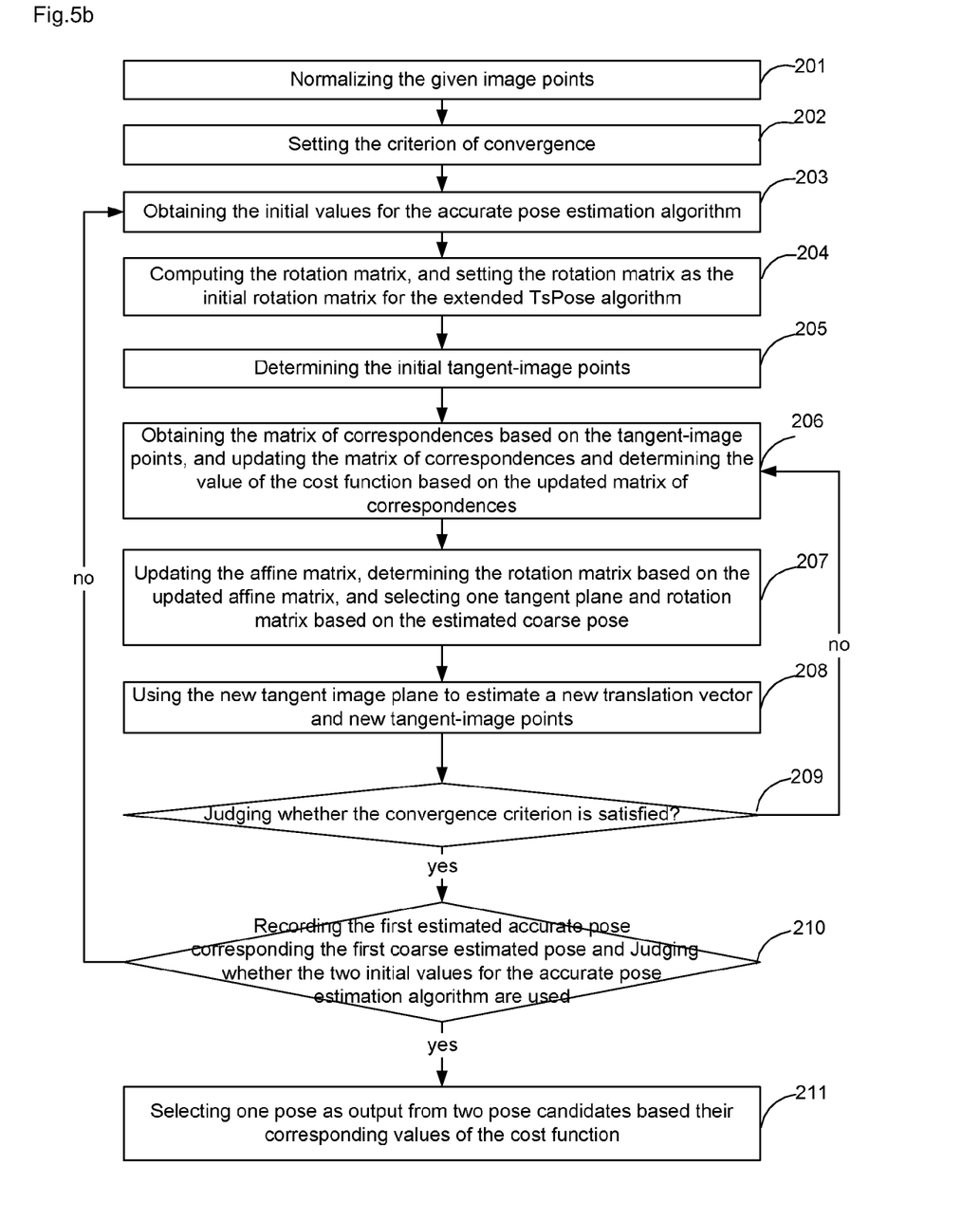
FIG. 5b is a flow diagram of the TsPose algorithm.

For example, FIG. 4a shows a simple embodiment for a model cluster and a image cluster in which the numbers of involved points are both six, the points in the left circle of FIG. 4a represent points in the model cluster, the points in the right circle of FIG. 4a represent points in the image cluster, and associated with the right correspondences between the model points and the image points is a affine transformation. The possible correspondences is 6!-720, for example, let the points in a model cluster sequentially denoted by "a-b-c-d-e-f" and the points in a image cluster sequentially denoted by "A-B-C-D-E-F", then their matched image points in the image cluster may sequentially given by, for example, "A-B-C-D-E-F", "A-C-B-D-E-F", "A-D-C-B-E-F". Thus, it is needed to evaluate the quality of all the 720 possible matching pairs of points sets based on a given criterion by which we can evaluate how well the model points match the image points, and then select good matching pairs from all the possible matching pairs that fall below a prescribed threshold of the criterion. Obviously, the computational cost of the work of evaluating and selecting pairs is significant since each of the 720 possible matching pairs is needed to be treated. After the steps of 102-105 are applied to the points in the model and image clusters, the matched points in the left and right sets of points will (i.e., the points in the dashed circle) be related with a rotation transformation, as is illustrated by FIG. 4b, as a result, the possible matching pairs reduce significantly with only 6 possible matching pairs need to be evaluated based on the criterion, therefore, the computational cost reduces significantly.

S106, using the original points in the model and image clusters whose indices are the same as those of the selected points in the matching pairs to estimate coarse poses;

After the matching pairs are obtained, it is needed to use the original points that whose indices are the same as those of the points in the matching pairs to estimate the associated affine transformation. In this step, using the original points that whose indices are the same as those of the points in the matching pairs to estimate the associated affine transformation, recover two rotation matrices according the formula (2-10), and then computing the pose angle (i.e., elevation angles and azimuth angles) based on the third columns of the two rotation matrices, meanwhile, estimating a coarse z-entry of the translation vector based on the affine transformation;

S107, using the k-means clustering method to cluster all the estimated pose to yield two possible coarse poses.

In this step, using the k-means clustering method to cluster the pose angles, the z-entry of the translation vector to yield two possible coarse pose angles and a coarse z-entry of the translation vector. The said coarse poses include two coarse pose angles and a z-entry of the translation vector. The said coarse pose angle include a coarse elevation angle and a azimuth angle.

An Exemplary Embodiment of the Coarse Pose Estimation Algorithm

In the embodiment, the transformation applied to the model clusters and the image clusters can be summarized as three steps as follows:

(1) subtracting the respective centroid from each model point in the model clusters, and subtracting the respective centroid from each image point in the image clusters. Let the model points denoted by $\{p_i\}$, and the image points denoted by $\{q_i\}$, the transformation relating $\{p_i\}$ and $\{q_i\}$ is $$q_i = Ap_i + t \tag{1-1}$$

where A is a 2×2 matrix, t is a 2×1 vector. Let the centroid of a model cluster be $m_p$, and the centroid of a image cluster be $m_q$, then $$\hat{q}_i = A\hat{p}_i \tag{1-2}$$

where $\hat{q}_i = q_i - m_q$, $\hat{p}_i = p_i - m_p$. Therefore, after the step 1) is applied, the model points of the model cluster and the image points of the image cluster are related by a linear transformation.

(2) applying the "whitening transformation" to the points $\hat{q}_i$ and $\hat{p}_i$, i.e., $$p'_i = S_{\hat{p}}^{-\frac{1}{2}} \hat{p}_i, \quad q'_i = S_{\hat{q}}^{-\frac{1}{2}} \hat{q}_i \tag{1-3}$$

where $$S_{\hat{p}} = \sum_{i=1}^{k+1} \hat{p}_i \hat{p}_i^t$$

represents the covariance of the model points $\hat{p}_i$, and $$S_{\hat{q}} = \sum_{i=1}^{k+1} \hat{q}_i \hat{q}_i^t$$

represents the covariance of the image points $\hat{q}_i$.

(3) Let the transformation relating transformed model points and transformed image points be the matrix $\overline{A}$, obviously, $$\overline{A} = S_{\hat{q}}^{-\frac{1}{2}} A S_{\hat{p}}^{-\frac{1}{2}}.$$

Figure 2:
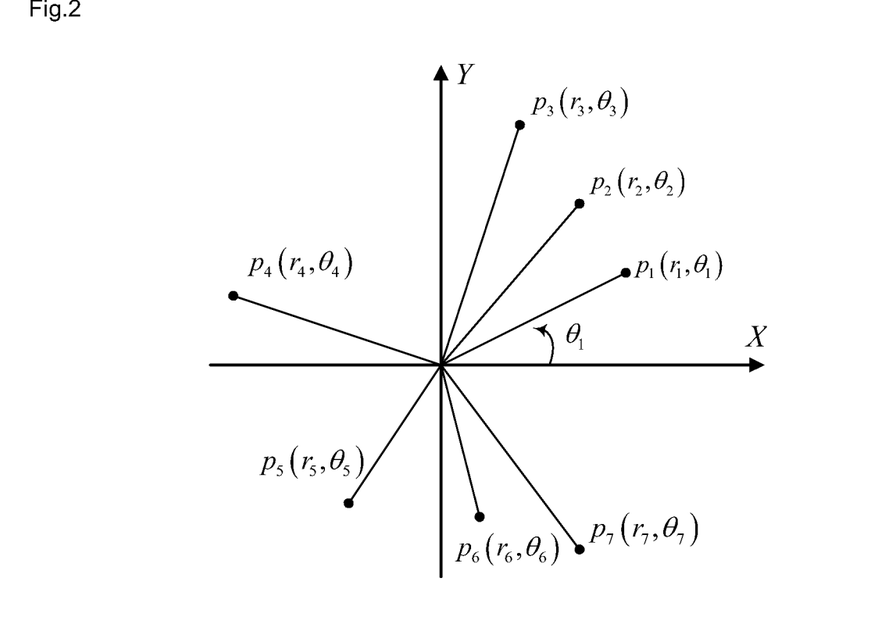
FIG. 2 is a drawing illustrating that the points in a cluster are arranged in an order such that their polar angles increase anti-clockwise.

Computing the polar coordinates of $p'_i$ and denote them by $(r_{p'_i}, \theta_{p'_i})^t$, and polar coordinates of $q'_i$ and denote them by $(r_{p'_i}, \theta_{p'_i})^t$, and arranging the model points in increasing order of polar angles $\theta_{p'_i}$ and the image points in increasing order of polar angles $\theta_{p'_i}$ as is illustrated by FIG. 2. It should be pointed out that the matrix $\overline{A}$ can be proved to be orthonormal.

After the steps of 1)-3) are applied, the transformed model points and image points are related by $$\begin{bmatrix} u_1 & u_2 & \dots & u_k \\ v_1 & v_2 & \dots & v_k \end{bmatrix} = R \begin{bmatrix} x_{w1} & x_{w2} & \dots & x_{wk} \\ y_{w1} & y_{w2} & \dots & y_{wk} \end{bmatrix} \tag{1-4}$$

where $q'_i = (u_i, v_i)^t$ is an image point, $p'_i = (x_{wi}, y_{wi})^t$ is a model point, and R is a 2×2 rotation matrix. The FIG. 4b illustrates the transformed model points and image points after the steps of 1)-3) are applied, wherein the points in the left circle are points in a model cluster, the points in the right circle are points in a image cluster, and the transformation relating the matched points pairs is rotation. The notation t denotes the transpose of a matrix or a vector.

In the embodiment, suppose that there are k points in a model cluster that are arranged in an increasing order of polar angles as is illustrated by FIG. 4b, then the k-dimensional model subspace spanned by the model points is denoted by $S_1 = \text{span}[v_1 \ v_2]$, where $v_1 = (x_{w1} \ x_{w2} \dots x_{wk})^t$, $v_2 = (y_{w1} \ y_{w2} \dots y_{wk})^t$; in the same way, the k-dimensional image subspace spanned by the image points in an image cluster is denoted by $S_2 = \text{span}[w_1 \ w_2]$, where $w_1 = (u_1 \ u_2 \dots u_k)^t$, $w_2 = (v_1 \ v_2 \dots v_k)^t$. Then, the subspace distance between $S_1$ and $S_2$ is given by $$\text{dist}(S_1, S_2) = \|P_1 - P_2\|_2 \tag{1-5}$$

where, $P_1$ is the projection matrix of the subspace $S_1$ and $P_2$ is the projection matrix of the subspace $S_2$, the norm of a matrix is the 2-norm, i.e., the biggest singular value of a matrix. The projection matrix can be computed by the existing standard method in mathematics and hence we omit the details of its computations here.

The second step—a method of accurately estimating the pose of a planar model, comprising the steps of:

S201, normalizing the given image points;

In the step, dividing each given image point by its norm, i.e., the normalization, to produce a set of unit vectors referred to as "bundles".

S202, set the convergence criterion;

In the step, the said convergence criterion includes: setting the initial uncertainty parameter $\beta\phi$, the maximum uncertainty parameter $\beta_F$, the updating uncertainty parameter $\beta_u$, and the initial match matrix M. Here, the updating rules of $\beta$ is $\beta^{k+1} = \beta^k \times \beta_u$, and the iteration terminates if $\beta^{k+1} > \beta_F$.

Alternatively, whether the method converges or not could be judged by the value of the cost function, when the right correspondences are found, the value of the cost function (2-7) should theoretically be zero, therefore, one could set a small constant number based on which the convergence of the method of the second step can be judged, specifically, the iterations of the method of the second step should be terminated when the value of cost function (2-7) falls below the prescribed small constant number.

It is need to point out that the iterations of the method of the second step can be terminated no matter which one of the two convergence criteria is satisfied.

S203, setting the initialization of the method of accurately estimating the pose of a planar model;

In the step, using the method of accurately estimating the pose of a planar model, i.e., the extended TsPose algorithm, with the initialization of the coarse pose angles and the coarse z-entry of the translation vector obtained in the coarse pose estimation algorithm.

It is needed to clarify that there is no limitation on how the initialization of the extended TsPose algorithm is set in the embodiment of the extended TsPose algorithm, i.e., the initialization of the extended TsPose algorithm can be carried out in several ways, for example, using one of the two coarse poses in the execution of the extended TsPose algorithm; or inputting both coarse poses simultaneously and using one of them respectively; or when the coarse pose estimation finishes, inputting the coarse poses into the medium for implementing the extended TsPose algorithm via the medium for implementing the coarse pose estimation algorithm, or calling the coarse poses from the medium implementing the coarse pose algorithm by the medium implementing the extended TsPose algorithm.

S204, computing rotation matrices, and using the computed rotation matrices as the estimated rotation matrices of the iterative searching of the extended TsPose algorithm;

In the step, computing a rotation matrix from a coarse pose angle by the rodrigues formula, and setting the rotation matrix as the initial rotation matrix of the extended TsPose algorithm, and generating the x-entry and the y-entry of the translation vector by the uniformly distributed pseudorandom generator, the z-entry of the translation vector is given by the coarse pose estimation algorithm. Here, the said coarse angle consists of the coarse elevation angle and the coarse azimuth angle.

S205, determining the initial "tangent-image" points;

In the steps of S203-S204, obtaining the rotation matrix R and the translation vector T, corresponding to:

$$R = \begin{bmatrix} r_{11} & r_{12} & r_{13} \\ r_{21} & r_{22} & r_{23} \\ r_{31} & r_{32} & r_{33} \end{bmatrix} \quad (2\text{-}1')$$

$$T = (t_x, t_y, t_z)^T \quad (2\text{-}2')$$

From (2-1') and (2-2') we can obtain two column vectors giving the parameters of the affine transformation as follows:

$$h_1^0 = \frac{1}{t_z}(r_{11}, r_{12}, t_x)^T \quad (2\text{-}3')$$

$$h_2^0 = \frac{1}{t_z}(r_{21}, r_{22}, t_y)^T \quad (2\text{-}4')$$

where, the superscript k=0 denotes the 0-iteration, i.e., the initialization, the superscript k denotes the number of iterations in the method of accurately estimating the pose of a planar model.

Let the model points in the world reference frame be $p_{wi} = (x_{wi}, y_{wi}, 1)^T$, we can obtain the initial tangent plane as $l^k = (r_{13}, r_{23}, r_{33})^T$ from (1), k=0, since the initial tangent plane $l^k$ and "bundles" (which have been obtained by the normalization step from the given image points) have been known, the "tangent-image" points $\hat{q}_i^k = (\hat{x}_i^k, \hat{y}_i^k)^T$, k=0 then can be computed by (2-2), (2-3).

S206, using the "tangent-image" points to compute the match matrix, updating the match matrix, and determining the value of the cost function by the updated match matrix;

In the step, let:

$$d_{ij} = (h_1 \boxdot p_{wj} - \hat{x}_i^k)^2 + (h_2 \bar{p}_{wj} - \hat{y}_i^k)^2 \quad (2\text{-}5')$$

then, computing the match matrix by:

$$m_{ij}^0 = \gamma e^{(\beta \times d_{ij} - \alpha)} \quad (2\text{-}6')$$

where, the superscript of $m_{ij}^0$ denotes the initial value of the match matrix before the application of the Sinkhorn algorithm. Using the Sinkhorn algorithm to update the match matrix. Let the updated elements of the match matrix be $m_{ij}$, then computing the value of the cost function (2-7), corresponding to:

$$E^k = \sum_{i=1}^{n_1} \sum_{j=1}^{n_2} (d_{ij}^2 - \alpha)$$

$$= \sum_{i=1}^{n_1} \sum_{j=1}^{n_2} m_{ij} \left( \left( h_1 \boxdot p_{wj} - \hat{x}_i^k \right)^2 + \left( h_2 \bar{p}_{wj} - \hat{y}_i^k \right)^2 - \alpha \right)$$

where, $h_1 = \lambda(a_{11}, a_{12}, b_1)^T$, $h_2 = \lambda(a_{21}, a_{22}, b_2)^T$, $\alpha$ is a small constant number.

It should be noted that, at the first iteration, $h_1$, $h_2$ are given by (2-3'), (2-4') respectively, and in the remain iterations, $h_1$, $h_2$, $\lambda$ are given by (2-8), (2-9) and (2-11) respectively.

S207, updating the affine transformation, recovering the rotation matrices based on the updated affine transformation, and selecting one rotation matrix and one corresponding tangent-image plane;

In the step, using the method of accurately estimating the pose of a planar model, i.e., the extended TsPose algorithm, to estimate the affine transformation relating image points and model points, and recovering two rotation matrices by (2-10), using the third columns of the two rotation matrices as the normal vectors of two new "tangent-image" planes and computing two groups of the second pose angles by the two normal vectors. Using the sinkhorn algorithm to update the match matrix.

For example: according to (2-8), (2-9), given $h_1 = (h_{11}, h_{12}, h_{13})^T$, $h_2 = (h_{21}, h_{22}, h_{23})^T$, and let $$A' = \begin{bmatrix} a'_{11} & a'_{12} \\ a'_{21} & a'_{22} \end{bmatrix},$$

then $$a'_{11} = h_{11}, a'_{12} = h_{12}, a'_{21} = h_{21}, a'_{22} = h_{22}$$

According to (2-11), we can obtain $\lambda$, since $A' = \lambda A$, we then obtain the matrix A, according to (2-10) we can obtain two rotation matrices $R_1$ and $R_2$, let the third column of $R_1$ be $l_1$, and the third column of $R_2$ be $l_2$, $l_1$ and $l_2$ denote the two new "tangent-image" planes respectively, as is illustrated by FIG. 2, we need to select one of the two "tangent-image" planes denoted by $l_1$ and $l_2$ to continue the iterative searching, the way of selecting the "tangent-image" plane is as follows:

Obtaining a group of pose angles by $l_1$, and denote it by $(\theta_1, \phi_1)$ (where $\theta_1$ is the elevation angle, $\phi_1$ is the azimuth angle), obtaining a group of pose angles by $l_2$, and denote it by $(\theta_2, \phi_2)$ ($\theta_2$ is the elevation angle, $\phi_2$ is the azimuth angle), let one group of pose angles obtained in the step of S203 be $(\theta, \phi)$ ($\theta$ is the elevation angle, $\phi$ is the azimuth angle), if $|\phi_1-\phi|<|\phi_2-\phi|$, the retaining $l_1$, and let the new "tangent-image" plane $l^{k+1}=l_1$, simultaneously retaining $R_1$ as the estimated rotation matrix at the k+1 iteration, let $R^{k+1}=R_1$; otherwise, retaining $l_2$, and let the new "tangent-image" plane $l^{k+1}=l_2$, retaining $R_2$ as the estimated rotation matrix at the k+1 iteration, let $R^{k+1}=R_2$.

In the embodiment, the said pose includes: pose angles and the translation vector. It should be pointed out that the pose angles can be obtained from the rotation matrix. Hence, the said pose is equivalent to the rotation matrix and the translation vector. In addition, one notable advantage of the embodiment of the present invention is its ability of finding the points-correspondences simultaneously when estimating the pose. Therefore, the final output result includes the rotation matrix, the translation vector, and the match matrix.

S208, using the new tangent-image plane to estimate the translation vector and the updated "tangent-image" point;

Here, substituting $l^{k+1}$ into (2-2), (2-3), corresponding to:

$$l^{k+1} \square (\omega_i^{k+1} \mathbf{\Theta} p_i)=1$$

$$V_i^{k+1}=\omega_i^{k+1} \mathbf{\Theta} \overline{p_i}$$

yields $$V_i^{k+1}=(\hat{x}_i^{k+1}, \hat{y}_i^{k+1}, \hat{z}_i^{k+1})^T \qquad (2\text{-}13)$$

According to the input coarse azimuth angle obtained in the coarse pose estimation algorithm, we can determine a new "tangent-image" plane.

A group of points are formed from $V_i^{k+1}$ and (k-th iteration)"tangent-image" points $\hat{q}_i^k$ as follows:

$$Q_i^k=(\hat{x}_i^{k+1}, \hat{y}_i^{k+1}, \hat{z}_i^{k+1})^T \qquad (2\text{-}14)$$

Then the rigidity constraints can be expressed by:

$$\lambda Q_i^k = R p_{wi} + T \qquad (2\text{-}16)$$

The parameter $\lambda$, R in (2-16) have been obtained in the step of S207, $Q_i^k$ is obtained in this step, and the model points $p_{wi}$ are known.

The translation vector T then can be obtained by minimizing the least-squares problem as follows:

$$\sum_{i=1}^n \|\lambda Q_i - (R p_{wi} + T)\| \qquad (2\text{-}17)$$

Since the function in (2-17) is quadratic in T, given a fixed rotation R, the optimal value for T can be computed in closed form as:

$$T = \frac{1}{n} \sum_{i=1}^n (\lambda Q_i - R p_{wi}) \qquad (2\text{-}18)$$

Therefore, based on $\{\lambda(Q_i^k), i=1, \ldots, n\}$, the model points $\{p_{wi}\}$, and the rotation matrix $R^k$, we can obtain the translation vector as follows:

$$T^k = \frac{1}{n} \sum_{i=1}^n (\lambda(Q_i^k) - R^k p_{wi}) \qquad (2\text{-}19)$$

Figure 6:
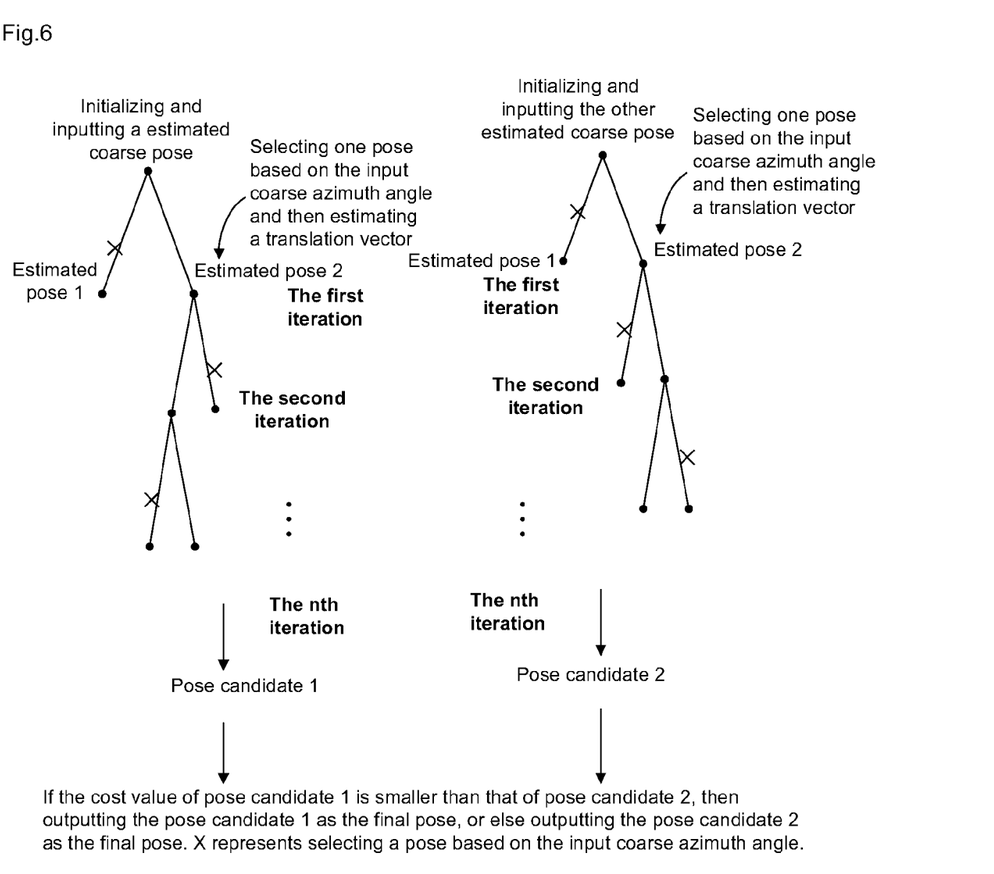
FIG. 6 is a flow diagram of the simultaneous pose and points-correspondences method.

It can be seen from the procedure mention above, or the FIG. 6 that illustrates the process of computing the rotation matrix and translation vector that, there are always two estimated poses and the corresponding two "tangent-image" points in the whole iterative process before the convergence criterion is satisfied.

In the step, computing the intersection points of the bundles with the two tangent planes of the unit sphere in the camera reference frame respectively and obtaining two sets of intersection points, forming the new "tangent-image" points by selecting the x-entries and the y-entries of the intersection points, and forming the three-dimensional estimated camera representatives of the model points by taking the z-entries of the new "tangent-image" points and the coordinates of the "old" "tangent-image" points and using them and the model points to estimate two translation vectors by (2-18). In the step, selecting new "tangent-image" plane and new "tangent-image" points.

In the embodiment, using both said coarse pose angles and coarse z-entries of the translation vector as the initializations to determine two new "tangent-image" planes, and obtained two estimated poses including the estimated pose 1 and estimated pose 2 based on the said new "tangent-image" planes. It should be pointed out that we should select one of the two estimated poses based on the input coarse azimuth angle, and the said estimated pose includes the rotation matrix and the translation vector.

S209, judging whether the convergence criterion is satisfied, if it does, then terminate the iterative searching, do S210; otherwise go back to S206 and continue the iterative searching with the new "tangent-image" points;

In the step, two ways for determining the convergence of the iterative searching are as follows:

(1) Judging whether the convergence criterion is satisfied, specifically, judging whether the uncertainty parameter $\beta^{k+1}=\beta^k \times \beta_u$ is bigger than $\beta_F$; if $\beta^{k+1}>\beta_F$, then exit the iterative searching, do S210; otherwise, go back to S206. or (2) Judging whether the convergence criterion is satisfied, specifically judging whether the value of cost function (2-7) is smaller than a prescribed value $\epsilon$; if the value of the cost function (2-7) is smaller than the prescribed value $\epsilon$, then exit the iterative searching, do S210; otherwise, go back to S206.

In the step, subtracting the second pose angles of the estimated poses from the coarse azimuth angle of the said coarse pose in the step of S203, and selecting the "tangent-image" plane and the "tangent-image" points corresponding to a smaller difference as the new "tangent-image" plane and new "tangent-image" points respectively, and then go back to do step S206 until the convergence criterion is satisfied.

Let the new "tangent-image" points given by (8) be:

$$q_i^{k+1}=(x_i^{k+1}, y_i^{k+1})^T \qquad (2\text{-}14')$$

In the step, using the new "tangent-image" plane and new "tangent-image" points as the current estimated results and do the steps of S206-S209, the process is repeated until the prescribed convergence criterion is satisfied. The said convergence criterion refers to the criterion for terminating the iterative loop, corresponding to: if $\beta > \beta_F$, terminate the iterative loop, or if the value of the cost function (2-7) is smaller than a prescribed value $\epsilon$, then terminate the iterative loop.

Then, after n iterations, we can obtain one estimate pose referred to as the candidate estimated pose 1; in the same way, using the other coarse pose as the initialization of the iterative searching, we can obtain the other estimated pose referred to the candidate estimated pose 2

In the following, we give a further explanation of the iterative searching of the embodiment with reference to FIG. 6:

With the initializations as the two coarse poses obtained by the step of S203 respectively, the iterative searching continues as illustrated by FIG. 6. Here, let the iterative searching branches initialized with the two coarse be the left searching branch and the right search branch respectively, as is illustrated by FIG. 6, let the estimated pose of the left searching branch be $\{R_1, T_1\}$, the corresponding match matrix be $M_1$, and the corresponding value of the cost function be $E_1$, let the estimated pose of the left searching branch be $\{R_2, T_2\}$, the corresponding match matrix be $M_2$, and the corresponding value of the cost function be $E_2$, if $E_1 < E_2$, them the final output of the iterative searching is as follows: the estimated pose $\{R_1, T_1\}$, the matched matrix $M_1$ otherwise, the estimated pose $\{R_2, T_2\}$, the matched matrix $M_2$.

S210, retaining the value of the cost function corresponding to a initialization of a given coarse pose, and judging whether both coarse poses are served as the initializations, if not, then go back to S203; if so, then go to step S211;

If there is a coarse pose that have not been used as the initialization, then go back to S203, and use it as the initialization of the iterative searching and begin the iterative process for accurately estimating the pose of a planar model.

S211, based on values of the cost function with the iterative searching initialized with different coarse poses, we obtain the final output result of the accurate pose.

In the step, retaining the value of the cost function each time when the iterative searching finishes, and selecting the candidate estimated pose corresponding to a smaller value of the cost function as the final output. Here, the said cost function refers to a quadratic function in terms of the correspondences between the model points and the image points and the transformation relating the model points and the image points.

For example, if the cost function value of the candidate estimated pose 1 is smaller than that of the candidate estimated pose 2, then use the candidate estimated pose 1 as the final output; otherwise, use the candidate estimated pose 2 as the final output.

The Exemplary Embodiment of the Accurate Pose Estimation Method

The extended TsPose algorithm in the disclosed invention is based on the assumption that the planar model is known, and the camera is calibrated. We use the image points normalized by the focal length, i.e., points on a image plane located at the focal length f=1, unless otherwise stated.

Figure 1:
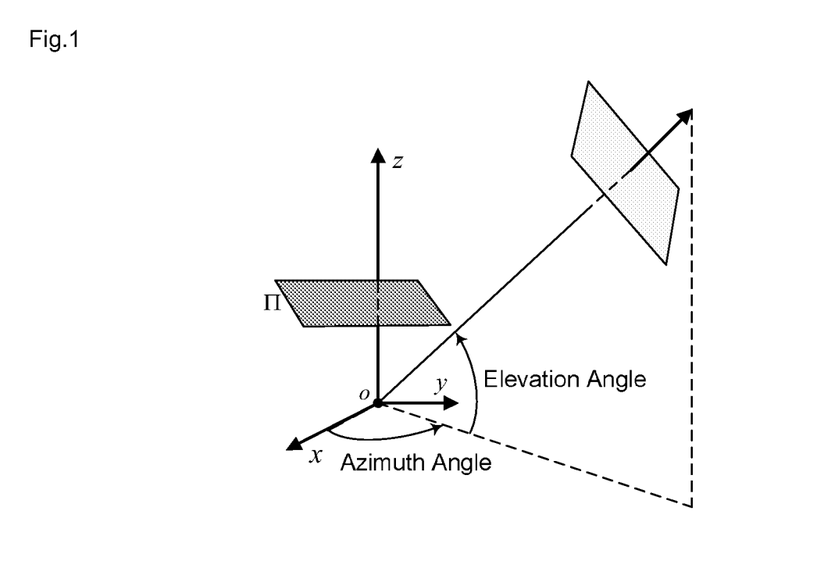
FIG. 1 is a drawing illustrating the pose of a planar model in the camera reference frame.

As is illustrated by FIG. 1, the optical center of a camera is O, focal length is 1, the image plane is $\pi$, the camera reference is defined with its origin located at the optical center, the x and y axes of the camera reference frame parallel to the image plane, and the z axis of the camera reference frame point is along the direction of the optical axis, in front of the camera and point at the viewer, the camera reference frame is oxyz.

Assume that the planar model is known, the z axis of the world reference frame is along the normal vector of the planar model, the world reference frame is defined such that its x, y and z axes satisfy the right handed rules, the world reference frame is denoted by $o_w x_w y_w z_w$, since the model points are coplanar, without loss of generality, we denote them by $p_{wi} = (x_{wi}, y_{wi}, 0)^T$, and use the notation $\tilde{p}_{wi} = (x_{wi}, y_{wi}, 1)^T$ as their homogeneous coordinates, the camera representatives of the model points are $p_i = (x_i, y_i, z_i)^T$, where i=1, 2, ..., n, the image points are $q_i = (u_i, v_i)^T$, and the homogenous image points are $\tilde{q}_i = (u_i, v_i, 1)^T$.

Let $oq_i = (u_i, v_i, 1)^T$, i=1, 2, ..., n, and $\hat{o}q_i = oq_i / \|oq_i\|$, and the unit normal vector of the image plane $\pi$ be $l = (l_x, l_y, l_z)^T$. Since the image plane in this invention is both a tangent plane of a unit sphere and a plane for imaging, the image plane $\pi$ is briefly referred to as tangent-image plane denoted by:

$$(l_x, l_y, l_z) \begin{pmatrix} x \\ y \\ z \end{pmatrix} = 1 \quad (2\text{-}1)$$

The intersection points of the bundles with the tangent-image plane are denoted by $V_i = (\hat{x}, \hat{y}, \hat{y})^T$, and $V_i$ are computed by combing (2-2) and (2-3):

$$l \cdot (\omega_i \hat{o} p_i) = 1 \quad (2\text{-}2)$$

$$V_i = \omega_i \hat{o} p_i \quad (2\text{-}3)$$

where $\omega_i$ is a scale factor, i=1, 2, ..., n.

To not be confused with the given image points q, we use $\hat{q}$ to denote the "new" image points, briefly referred to as "tangent-image" points, the coordinates of the "tangent-image" points are formed by taking the x and y entries of the points $V_i$, i.e., $\bar{q}_i = (\hat{x}_i, \hat{y}_i)^T$, and their corresponding homogeneous points are $\tilde{q}_i = (\hat{x}_i, \hat{y}_i, 1)^T$. Assume that the tangent-image plane $\pi$ is updated by k iterations, i.e., at the kth iteration, the unit normal vector of the tangent-image plane $\pi$ is $l^k$, and the "tangent-image" points are $\tilde{q}_i^k$ (the superscript k denotes the kth iteration, the subscript I denotes the index of the "tangent-image" point), then $\tilde{q}_i^k$ and model points $\tilde{p}_{wi}$ are related by the following affine transformation:

$$\begin{pmatrix} \tilde{x}_i^k \\ \tilde{y}_i^k \\ 1 \end{pmatrix} = \lambda \begin{bmatrix} a_{11} & a_{12} & b_1 \\ a_{21} & a_{22} & b_2 \\ 0 & 0 & 1 \end{bmatrix} \begin{pmatrix} x_{wi} \\ y_{wi} \\ 1 \end{pmatrix} \quad (2\text{-}4)$$

(2-4) can be briefly rewritten as:

$$\hat{q}_i^k = \lambda (A \bar{p}_{wi} + B) \quad (2\text{-}5)$$

where, $\lambda$ is a scale factor, $\bar{p} = (x_{wi}, y_{wi})^T$, $$A = \begin{bmatrix} a_{11} & a_{12} \\ a_{21} & a_{22} \end{bmatrix},$$

and $B = (b_1, b_2)^T$.

To solve the affine parameters of (2-5), we define the cost function as follows:

$$E^k = \sum_{i=1}^{n}\left(\left(h_1 \Box \bar{p}_{wi} - \hat{x}_i^k\right)^2 + \left(h_2 \bar{p}_{wi} - \hat{y}_i^k\right)^2\right) \quad (2\text{-}6)$$

where, $h_1 = \lambda(a_{11}, a_{12}, b_1)^T$, $h_2 = \lambda(a_{21}, a_{22}, b_2)^T$.

When the points-correspondences are unknown, the cost function E in (2-6) must be modified accordingly. In the following, we first introduce the match matrix M representing the points-correspondences, let the number of model points be $n_1$, and the number of image points be $n_2$, since the points-correspondences are unknown, then each image point $q_i$ (i=1, 2, ..., $n_2$) can match any of the model points $p_{wj}$ (j=1, 2, ..., $n_1$), suppose that the variables $m_{ij}$ (i=1, 2, ..., $n_2$, j=1, 2, ..., $n_1$) represent the correspondence, then $m_{ij}=1$ implies a matched pair while $m_{ij}=0$ implies a unmatched pair, therefore the matrix M must be a permutation matrix, wherein the element of the matrix M should be either 0 or 1, and each row and column of the matrix add up to one, i.e., there is a two-way constraints imposed on the matrix M. In view of the fact of occlusion and the failure of the image detection algorithm in some condition, we add an extra row and column to M, slack row $n_1+1$ and slack column $n_2+1$, to represent the unmatched points. A value of 1 in the slack row $n_1+1$ at column k, $m_{i,n_1+1}=1$, indicates that the k image point has not found any match among the model points, and a value of 1 in the slack column $n_2+1$ at row j, $m_{n_2+1,j}=1$, indicates that the j model point has not found any match among the image points.

To simultaneously solving the match matrix M and the affine transformation, we modify the cost function in (2-6) as follows:

$$E^k = \sum_{i=1}^{n_1}\sum_{j=1}^{n_2}(d_{ij}^2 - \alpha) \quad (2\text{-}7)$$

$$= \sum_{i=1}^{n_1}\sum_{j=1}^{n_2} m_{ij}\left(\left(h_1 \Box \bar{p}_{wj} - \hat{x}_i^k\right)^2 + \left(h_2 \bar{p}_{wi} - \hat{y}_i^k\right)^2 - \alpha\right)$$

where, $h_1 = \lambda(a_{11}, \alpha_{12}, b_1)^T$, $h_2 = \lambda(a_{21}, a_{22}, b_2)^T$, and $\alpha$ is a small constant number.

Updating the match matrix M by the sinkhorn algorithm with the steps of:

a) initialize M by $m_{ij}^0 = \gamma \times e^{(\beta \times d_{ij} - \alpha)}$, $1 \le i \le m$, $1 \le j \le n$, and assigning a small number to $m_{i,n+1}$, $1 \le i \le m+1$ and $m_{m+1,j}$, $1 \le j \le n+1$;

b) normalize each row of the matrix by:

$$m_{ij}^{k+1} = \frac{m_{ij}^k}{\sum_{j=1}^{n+1} m_{ij}^k}, 1 \le i \le m, 1 \le j \le n+1;$$

c) normalize each row of the matrix by:

$$m_{ij}^{k+1} = \frac{m_{ij}^{k+1}}{\sum_{i=1}^{m+1} m_{ij}^{k+1}}, 1 \le i \le m+1, 1 \le j \le n;$$

The cost function $E^k$ are quadratic in the unknown vectors $h_1$ and $h_2$, let the partial derivatives of $E^k$ with respect to $h_1$ and $h_2$ be $$\frac{\partial E^k}{\partial h_1} \text{ and } \frac{\partial E^k}{\partial h_2}$$

respectively, to compute the optimal values of $h_1$ and $h_2$ that minimize the cost function $E^k$, we should set $$\frac{\partial E^k}{\partial h_1} = 0 \text{ and } \frac{\partial E^k}{\partial h_2} = 0,$$

when the correspondence variables $m_{ij}$ are fixed, the optimal values of $h_1$ and $h_2$ are computed in closed form as:

$$h_1 = \left(\sum_{j=1}^{n_1} m_j' p_{wj} p_{wj}^T\right)^{-1} \sum_{i=1}^{n_1}\sum_{j=1}^{n_2} m_{ij} \hat{x}_i^k p_{wj} \quad (2\text{-}8)$$

$$h_2 = \left(\sum_{j=1}^{n_1} m_j' p_{wj} p_{wj}^T\right)^{-1} \sum_{i=1}^{n_1}\sum_{j=1}^{n_2} m_{ij} \hat{y}_i^k p_{wj} \quad (2\text{-}9)$$

where, $$m_j' = \sum_{i=1}^{n_2} m_{ij},$$

Assume that $$A' = \begin{bmatrix} a_{11}' & a_{12}' \\ a_{21}' & a_{22}' \end{bmatrix} = \lambda A, B' = (b_1', b_2')^T = \lambda B,$$

we can recover two rotation matrices $R_1$ and $R_2$ with the 2×2 matrix A embedded in the upper left part, and the scale factor $\lambda$ from the 2×2 matrix A', the specific forms of the two rotation matrices are as follows:

$$R_1 = \begin{bmatrix} a_{11} & a_{12} & (1 - a_{11}^2 - a_{12}^2)^{1/2} \\ a_{21} & a_{22} & s(1 - a_{21}^2 - a_{22}^2)^{1/2} \\ a_{31} & a_{32} & a_{33} \end{bmatrix}, \quad (2\text{-}10)$$

$$R_2 = \begin{bmatrix} a_{11} & a_{12} & -(1 - a_{11}^2 - a_{12}^2)^{1/2} \\ a_{21} & a_{22} & -s(1 - a_{21}^2 - a_{22}^2)^{1/2} \\ -a_{31} & -a_{32} & a_{33} \end{bmatrix}$$

$$\lambda^2 = 2(a_{11}'a_{22}' - a_{12}'a_{21}')^2 / \left\{S_r - [S_r^2 - 4(a_{11}'a_{22}' - a_{12}'a_{21}')^2]^{\frac{1}{2}}\right\} \quad (2\text{-}11)$$

where, S=−sign $(a_{11}a_{21}+a_{12}a_{22})$, sign denotes the sign of its argument, the three columns of the two rotation matrices satisfy the right-hand rule, and $S_r = a_{11}^2 + a_{12}^2 + a_{21}^2 + a_{22}^2$.

Note that the unit normal vector l of the tangent-image $\pi$ is along the optical axis and $\lambda l$ represents a vector perpendicular to the planar model in the camera reference frame. Hence, we use the positive $\lambda$, corresponding to:

$$\lambda = \sqrt{2(a'_{11}a'_{22} - a'_{12}a'_{21})^2 / \left\{ S_r - [S_r^2 - 4(a'_{11}a'_{22} - a'_{12}a'_{21})^2]^{\frac{1}{2}} \right\}} \quad (2\text{-}12)$$

Let $l_1$ and $l_2$ be the third columns of the rotation matrices $R_1$ and $R_2$, the two new "tangent-image" plane. One pose angles computed by $l_1$ are $(\theta_1, \phi_1)$ (wherein $\theta_1$ denotes the elevation angle, and $\phi_1$ denotes the azimuth angle), the other pose angles computed by $l_2$ are $(\theta_2, \phi_2)$ (wherein $\theta_2$ denotes the elevation angle, and $\phi_2$ denotes the azimuth angle). Suppose the pose angles are given by $(\theta, \phi)$ are obtained by S203 (wherein $\theta$ denotes the elevation angle, and $\phi$ denotes the azimuth angle), If $|\phi_1 - \phi| < |\phi_2 - \phi|$, then $l^{k+1} = l_1$, otherwise $l^{k+1} = l_2$.

Then, substituting $l^{k+1}$ into (2-2), (2-3), corresponding to:

$$l^{k+1} \square (\omega_i^{k+1} \mathbf{0}_{p_i}) = 1$$

$$V_i^{k+1} = \omega_i^{k+1} \mathbf{0} p_i$$

From the two equations above, we obtain $$V_i^{k+1} = (\hat{x}_i^{k+1}, \hat{y}_i^{k+1}, \hat{z}_i^{k+1})^T \quad (2\text{-}13)$$

Using $V_i^{k+1}$ and (the kth iteration) "tangent-image" points "$\hat{q}_i$" to form a set of points as follows:

$$Q_i^k = (\hat{x}_i^{k+1}, \hat{y}_i^{k+1}, \hat{z}_i^{k+1})^T \quad (2\text{-}14)$$

Based on the rigidity constraints, we obtain:

$$\lambda Q_i^k = R p_{wi} + T \quad (2\text{-}16)$$

The translation vector can be obtained by minimizing the least-squares errors as:

$$\sum_{i=1}^{n} \|\lambda Q_i - (R p_{wi} + T)\| \quad (2\text{-}17)$$

Since (2-17) is quadratic in T, given a fixed rotation matrix R, the optimal value of the translation vector T is given in closed form as:

$$T = \frac{1}{n} \sum_{i=1}^{n} (\lambda Q_i - R p_{wi}) \quad (2\text{-}18)$$

Therefore, based on the points $\{\lambda(Q_i^k) \, i=1, \ldots, n\}$, $\{p_{wi}\}$, and the rotation matrix $R^k$, we can obtain:

$$T^k = \frac{1}{n} \sum_{i=1}^{n} (\lambda(Q_i^k) - R^k p_{wi}) \quad (2\text{-}19)$$

It should be pointed out here that, in the embodiment, the said extended TsPose is an algorithm combining the soft-assgin algorithm for finding correspondences and the TsPose algorithm for accurately estimating the pose of a planar model, the match matrix M in the extended TsPose algorithm is one of the parameters needed to be solved in the iterative searching, and when the match matrix M remains constant and equals to an identity matrix during iterations, the extended TsPose algorithm turns into the TsPose algorithm.

Numerical Embodiment of the Present Invention

The simulated camera is with the focal length 769 pixel, the image size 512×512, the principal point (256,256), and the pixel size 0.0076 mm. The model points and the added spurious points are uniformly distributed in a square with 200 mm width, the number of model points is 50, the ratio between the number of spurious points and that of the model points is 1:2, the number of image points is 75, the image points are added the Gaussian Noise with 0 mean and 1 pixel standard deviation. The elevation angle is set to be 65 degree, and the azimuth angle is set to be 60 degree, the translation vector is [0.5; 1; 1600] (mm). The maximum number of iterations for the extended TsPose algorithm is 50.

Step 1: let the number of neighbor points in the Euclidean distance sense be 7, and constructing 50 model clusters and 50 image clusters.

Step 2: Applying a transformation to the 50 model clusters, which includes: subtracting the corresponding centroid from each model cluster, then applying the "whitening transform", and computing the polar angles of each model cluster and arranging the model points in each model cluster in an increasing order of polar angles; similarly, applying the same procedure to the image clusters.

Step 3: computing the subspace distance between the image points of an image cluster in 8 permutations and the ordered model points in a model cluster, and then constructing the subspace distance matrix.

Step 4: set the threshold 2 for the subspace distances, and selecting the model clusters and image clusters whose corresponding subspace distances fall below the threshold 2.

Step 5: using the original points in the model clusters and image clusters whose indices are the same as those of the selected points in the matching pairs to estimate the affine transformation and then obtain a coarse pose estimate associated with each matching pair, and using the k-means clustering method to cluster all the estimated pose to yield two coarse pose.

Step 6: using both coarse pose estimates as the initializations of the extended TsPose algorithm and the baseline of selecting estimated pose in the iterative searching, and obtaining two candidate estimated poses and match matrices.

Step 7: if the cost function value of the candidate estimated pose 1 is smaller than that of the candidate estimated pose 2, then using the candidate estimated pose 1 as the final pose result, and the corresponding match matrix as the final match matrix; otherwise, we use the candidate estimated pose 2 and its corresponding match matrix as the final output result.

Figure 3:
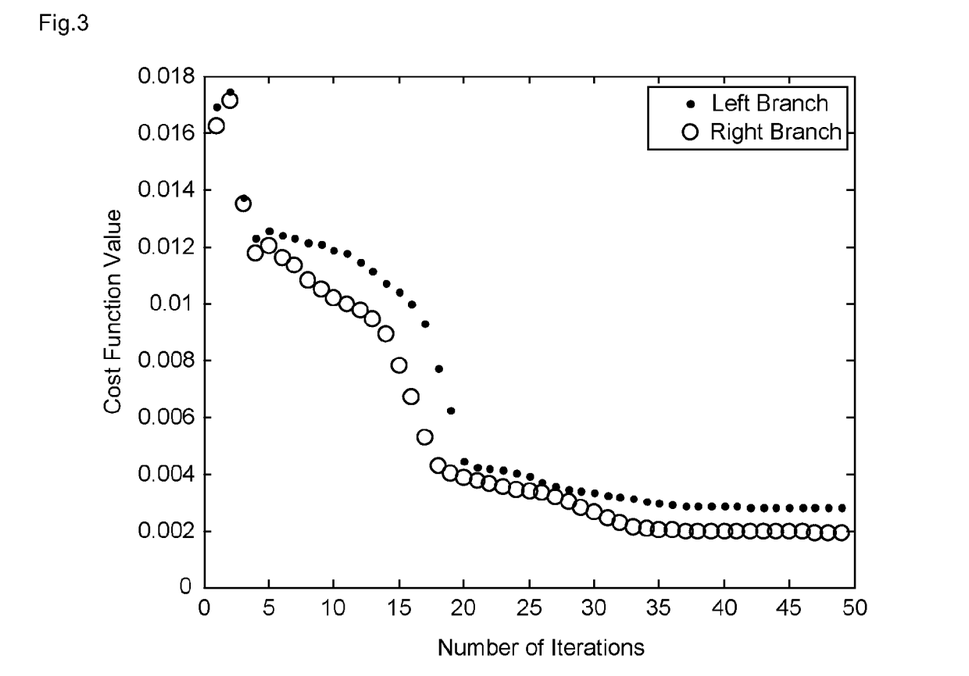
FIG. 3 is a drawing illustrating the geometric meaning of the TsPose algorithm.

We present a curve plot of the cost function in the numerical exemplary embodiment, as is illustrated by FIG. 3. As can be observed by FIG. 3, the values of the cost function remain almost constant. Since the estimated pose is selected from two poses per iteration based on the coarse estimated pose and thus iterative searching is constrained to search in the vicinity of the coarse estimated pose, it is impossible to obtain a good estimated pose if the input coarse estimated pose is far from the true pose, and the corresponding cost function value will not smaller than that of the iterative searching in the vicinity of a coarse estimate pose near to the true pose. The output result of the computer program includes: the elevation angle 66.81 degree, the azimuth angle 60 degree, the translation vector [−0.03; 1.26; 1611.40] (mm), the error of the elevation angle 1.81 degree, the error of the azimuth angle 0 degree, the relative error of the translation vector 0.72%, the ratio of right matches 100%.

The present invention includes an embodiment of the method of the simultaneous pose and points-correspondences determination from a planar model are disclosed, which can solves problem of pose redundancy in the simultaneous pose and points-correspondences determination from a planar model. In addition, the disclosed embodiment is based on the coplanar points, and does not place restriction on the shape of a planar model. It performs well in a cluttered and occluded environment, and is noise-resilient in the presence of different levels of noise.

Accordingly, it should be apparent to those skilled in the art that the above steps of exemplary embodiments of the present invention can be implemented by computer. Those steps can be implemented in a single computer, or in a network composed of several computers; alternatively, they are implemented by some computer-readable codes, thus, they can be implemented by the computer-readable medium storing a computer program, or implemented by different electronics devices or an integrated electronics device. Other non-limiting exemplary embodiment(s) may be utilized and derived from the disclosure such that structural, logical substitutions and changes may be made without departing from the true spirit and scope of the present disclosure.

To implement the said method, the present invention also disclose a computer program product of the simultaneous pose and points-correspondences determination from a planar model, comprising:

A computer-readable medium storing a computer program implementing the method described above, and a computer-readable code implementing the method of the simultaneous pose and points-correspondences determination from a planar model; the method of the simultaneous pose and points-correspondences determination from a planar model including:

Obtaining two possible coarse poses of the planar model based on a coarse pose estimation algorithm;

Obtaining two pose candidates based on the iterative searching of the extended TsPose algorithm which is initialized by each of the two possible coarse pose estimates; and Selecting a pose as the final output from the two pose candidates based on said coarse poses.

The computer program produce described above, wherein said obtaining two pose candidates based on the iterative searching of the extended TsPose algorithm further comprises:

using each of the two coarse pose estimates as an initial estimate, forming the initial correspondences matrix based on the computations of the initial "tangent-image" points and updating the correspondences matrix, and estimating the objective function value;

updating the affine transformation and recovering two rotation matrices based on the updated affine transformation, selecting a new rotation matrix and a new tangent-image plane based on the coarse azimuth angle of the coarse pose in the initial, and estimating a new translation vector and new "tangent-image" points based on the new tangent-image plane;

determining whether the convergence criterion is satisfied, if it is satisfied, then terminating the iterative searching of the extended TsPose algorithm; if not, then continuing the new iteration based on the estimated new "tangent-image" points until the convergence criterion is satisfied; and said pose estimate including a rotation matrix, a translation vector, and/or a correspondence matrix; using said pose estimate as a pose candidate when the iterative searching is terminated.

The computer program product described above, wherein said method further comprises:

When the iterative searching terminates, judging whether said initial estimate is used, if there unused is said initial estimate, using the unused said initial estimate as the initial estimate of the extended TsPose algorithm and conducting the iterative searching of the extended TsPose algorithm to obtain a pose candidate.

The computer program product described above, wherein said convergence criterion is that the uncertainty parameter $\beta$ is more than the prescribed maximum value, wherein the uncertainty parameter $\beta$ corresponds to the multiplication of the initial $\beta_0$ and a uncertainty update parameter $\beta_u$; and/or, said convergence criterion is that the objective function value is smaller than a prescribed parameter $\epsilon$;

Whenever either of said convergence criterions is satisfied, the iterative searching is terminated.

The computer program product described above, wherein selecting a pose as the final output from the two pose candidates based on said coarse poses further comprises:

When two said initial estimates are used, selecting the pose candidate corresponding to a smaller objective function value and using it as the final output accurate pose result.

The exemplary embodiments of the present invention are provided for illustration purpose only and not for the purpose of limiting the invention as defined by the appended claims and their equivalents.

What is claimed is:

1. A method for the simultaneous pose and points-correspondences determination from a planar model, comprising:

Obtaining two possible coarse pose estimates of the planar model based on a coarse pose estimation algorithm;

Obtaining two pose candidates based on iterative searching of an extended TsPose algorithm which is initialized by each of the two possible coarse pose estimates, wherein the extended TsPose algorithm is an algorithm combined with Softassian algorithm for estimating the points-correspondences and TsPose algorithm for accurate pose determination in an iterative scheme: and Selecting a pose as a final output from the two pose candidates based on said coarse pose estimates:

wherein iteratively searching for pose candidates by the extended TsPose algorithm includes:

using each of the two coarse pose estimates as an initial estimate, forming an initial correspondences matrix based on the computations of initial tangent-image points and updating the correspondences matrix, and estimating an objective function value:

updating affine transformation and recovering two rotation matrices based on the updated affine transformation, selecting a new rotation matrix and a new tangent-image plane based on a coarse azimuth angle of the coarse pose estimate in the initial, and estimating a new translation vector and new tangent-image points based on the new tangent-image plane:

determining whether a convergence criterion is satisfied, if it is satisfied, then terminating the iterative searching of the extended TsPose algorithm: if not, then continuing a new iteration based on the estimated new tangent-image points until the convergence criterion is satisfied; and each of the two coarse pose estimates including a rotation matrix, a translation vector, and/or a correspondence matrix; using said coarse pose estimates as pose candidates when the iterative searching is terminated.

2. The method of claim 1, also comprising:

When the iterative searching terminates, judging whether said initial estimate is used, if there unused is said initial estimate, using the unused said initial estimate as the initial estimate of the extended TsPose algorithm and conducting the iterative searching of the extended TsPose algorithm to obtain the pose candidates.

3. The method of claim 1, further comprising:

The convergence criterion is that the uncertainty parameter $\beta$ is more than the prescribed maximum value, wherein the uncertainty parameter $\beta$ corresponds to the multiplication of the initial $\beta_0$ and a uncertainty update parameter $\beta_u$; and/or, said convergence criterion is that the objective function value is smaller than a prescribed parameter $\epsilon$;

Whenever either of said convergence criterions is satisfied, the iterative searching is terminated.

4. The method of claim 1, wherein selecting a pose as a final output from the two pose candidates based on said coarse pose estimates further comprising:

When two said initial estimates are used, selecting the pose candidate corresponding to a smaller objective function value and using it as the final output accurate pose result.

5. A computer program product of the simultaneous pose and points-correspondences determination from a planar model, comprising:

A non-transitory computer-readable medium storing a computer program implementing the method described above, and a computer-readable code implementing the method of the simultaneous pose and points-correspondences determination from a planar model; the method of the simultaneous pose and points-correspondences determination from a planar model including:

Obtaining two possible coarse pose estimates of the planar model based on a coarse pose estimation algorithm;

Obtaining two pose candidates based on iterative searching of an extended TsPose algorithm which is initialized by each of the two possible coarse pose estimates, wherein the extended TsPose algorithm is an algorithm combined with Softassian algorithm for estimating the points-correspondences and TsPose algorithm for accurate pose determination in an iterative scheme: and Selecting a pose as a final output from the two pose candidates based on said coarse pose estimates:

wherein the obtaining two pose candidates based on iterative searching of extended TsPose algorithm further comprising:

using each of the two coarse pose estimates as an initial estimate, forming an initial correspondences matrix based on the computations of initial tangent-image points and updating the correspondences matrix, and estimating an objective function value:

updating affine transformation and recovering two rotation matrices based on the updated affine transformation, selecting a new rotation matrix and a new tangent-image plane based on a coarse azimuth angle of the coarse pose estimate in the initial, and estimating a new translation vector and new tangent-image points based on the new tangent-image plane:

determining whether a convergence criterion is satisfied, if it is satisfied, then terminating the iterative searching of the extended TsPose algorithm: if not, then continuing a new iteration based on the estimated new tangent-image points until the convergence criterion is satisfied: and each of the two coarse pose estimates including a rotation matrix, a translation vector, and/or a correspondence matrix; using said coarse pose estimates as pose candidates when the iterative searching is terminated.

6. The computer program product of claim 5, further comprising:

When the iterative searching terminates, judging whether said initial estimate is used, if there unused is said initial estimate, using the unused said initial estimate as the initial estimate of the extended TsPose algorithm and conducting the iterative searching of the extended TsPose algorithm to obtain the pose candidates.

7. The computer program product of claim 5, further comprising:

the convergence criterion is that the uncertainty parameter $\beta$ is more than the prescribed maximum value, wherein the uncertainty parameter $\beta$ corresponds to the multiplication of the initial $\beta_0$ and a uncertainty update parameter $\beta_u$; and/or, said convergence criterion is that the objective function value is smaller than a prescribed parameter $\epsilon$;

Whenever either of said convergence criterions is satisfied, the iterative searching is terminated.

8. The computer program product of claim 5, wherein selecting a pose as a final output from the two pose candidates based on said coarse pose estimates comprising:

When two said initial estimates are used, selecting the pose candidate corresponding to a smaller objective function value and using it as the final output accurate pose result.

9. The method of claim 2, wherein selecting a pose as a final output from the two pose candidates based on said coarse pose estimates further comprising:

When two said initial estimates are used, selecting the pose candidate corresponding to a smaller objective function value and using it as the final output accurate pose result.

10. The method of claim 3, wherein selecting a pose as a final output from the two pose candidates based on said coarse pose estimates further comprising:

When two said initial estimates are used, selecting the pose candidate corresponding to a smaller objective function value and using it as the final output accurate pose result.

11. The computer program product of claim 6, wherein selecting a pose as a final output from the two pose candidates based on said coarse pose estimates comprising:

When two said initial estimates are used, selecting the pose candidate corresponding to a smaller objective function value and using it as the final output accurate pose result.

12. The computer program product of claim 7, wherein selecting a pose as a final output from the two pose candidates based on said coarse pose estimates comprising:

When two said initial estimates are used, selecting the pose candidate corresponding to a smaller objective function value and using it as the final output accurate pose result.

* * * * *